US010631535B2

(12) United States Patent
Bird et al.

(10) Patent No.: US 10,631,535 B2
(45) Date of Patent: Apr. 28, 2020

(54) FOAM FORMULATIONS AND EMULSIFIABLE CONCENTRATES

(71) Applicant: FMC Corporation, Philadelphia, PA (US)

(72) Inventors: David Bird, Plainsboro, NJ (US); Timothy M. Martin, Ringoes, NJ (US); Laibin B. Yan, North Wales, PA (US)

(73) Assignee: FMC Corporation, Philadelphia, PA (US)

( * ) Notice: Subject to any disclaimer, the term of this patent is extended or adjusted under 35 U.S.C. 154(b) by 0 days.

(21) Appl. No.: 14/748,371

(22) Filed: Jun. 24, 2015

(65) Prior Publication Data
US 2015/0366187 A1 Dec. 24, 2015

Related U.S. Application Data

(60) Provisional application No. 62/016,242, filed on Jun. 24, 2014.

(51) Int. Cl.
*A01N 25/16* (2006.01)
*A01N 53/00* (2006.01)
*A01N 25/04* (2006.01)
*A01N 25/30* (2006.01)
*A01N 25/02* (2006.01)

(52) U.S. Cl.
CPC ............ *A01N 25/16* (2013.01); *A01N 25/02* (2013.01); *A01N 25/04* (2013.01); *A01N 25/30* (2013.01); *A01N 53/00* (2013.01)

(58) Field of Classification Search
None
See application file for complete search history.

(56) References Cited

U.S. PATENT DOCUMENTS

| 3,922,977 | A | | 12/1975 | Lavo et al. |
| 4,356,934 | A | | 11/1982 | Knake |
| 4,405,779 | A | | 9/1983 | Wiley |
| 4,436,905 | A | | 3/1984 | Bonse |
| 4,975,425 | A | | 12/1990 | Barnett, Jr. |
| 5,096,903 | A | | 3/1992 | Uhr et al. |
| 5,308,827 | A | * | 5/1994 | Sakamoto ............... A01N 25/06 504/206 |
| 5,460,106 | A | | 10/1995 | Crockett et al. |
| 5,527,760 | A | | 6/1996 | Rensing et al. |
| 5,798,316 | A | | 8/1998 | Theodoridis |
| 5,834,006 | A | | 11/1998 | Smith et al. |
| 5,881,493 | A | | 3/1999 | Restive |
| 6,071,858 | A | | 6/2000 | Modrcin et al. |
| 6,159,903 | A | | 12/2000 | Linker et al. |
| 6,180,088 | B1 | | 1/2001 | Ohtsubo et al. |
| 6,214,771 | B1 | | 4/2001 | Dexter |
| 6,289,829 | B1 | | 9/2001 | Fish et al. |
| 6,755,400 | B2 | | 6/2004 | Howe |
| 7,022,651 | B1 | | 4/2006 | Lightcap, Jr. et al. |
| 8,029,827 | B2 | | 10/2011 | Martin |
| 8,969,554 | B2 | | 3/2015 | Shibayama et al. |
| 2004/0071653 | A1 | * | 4/2004 | Bratescu ............... A01N 33/12 424/70.24 |
| 2004/0231575 | A1 | | 11/2004 | Wilkerson et al. |
| 2005/0215433 | A1 | * | 9/2005 | Benitez ............... A01N 25/02 504/254 |
| 2006/0166898 | A1 | | 7/2006 | Chen |
| 2006/0178271 | A1 | | 8/2006 | Lynch et al. |
| 2007/0020304 | A1 | | 1/2007 | Tamarkin et al. |
| 2010/0016160 | A1 | | 1/2010 | Bettarini et al. |
| 2010/0016163 | A1 | * | 1/2010 | Keiper ............... A01N 25/30 504/206 |
| 2010/0179198 | A1 | | 7/2010 | Mertoglu et al. |
| 2010/0184599 | A1 | * | 7/2010 | Parrish ............... A01N 25/02 504/128 |
| 2010/0204283 | A1 | * | 8/2010 | Dairiki ............... A01N 25/30 514/357 |
| 2010/0260873 | A1 | * | 10/2010 | Lindner ............... A01N 25/04 424/747 |
| 2011/0070278 | A1 | * | 3/2011 | Lopez ............... A01N 43/653 424/405 |
| 2012/0087987 | A1 | * | 4/2012 | Man ............... A01N 53/00 424/529 |
| 2012/0142533 | A1 | * | 6/2012 | Richard ............... A01N 43/80 504/271 |
| 2012/0149570 | A1 | | 6/2012 | Burke et al. |
| 2012/0283103 | A1 | | 11/2012 | Groenewegen et al. |
| 2013/0123104 | A1 | | 5/2013 | McKnight et al. |
| 2015/0093426 | A1 | | 4/2015 | Martin et al. |

FOREIGN PATENT DOCUMENTS

| CN | 1871913 A | 12/2006 |
| CN | 101179928 A | 5/2008 |
| CN | 101677527 A | 3/2010 |
| CN | 102458126 A | 5/2012 |
| CN | 102595881 A | 7/2012 |
| CN | 102666477 A | 9/2012 |
| EP | 0488668 A1 | 6/1992 |
| EP | 1449914 A1 | 8/2004 |
| GB | 1462560 A | 1/1977 |
| JP | H04-305502 A | 10/1992 |
| JP | H05-000904 A | 1/1993 |
| JP | H08-225414 A | 9/1996 |
| JP | 2004-195329 A | 7/2004 |
| JP | 2008-074659 A | 4/2008 |
| JP | 2008-531470 A | 8/2008 |
| JP | 2009-521477 A | 6/2009 |

(Continued)

OTHER PUBLICATIONS

Stepan (Stepan Company, NINEX® MT630F, http://www.stepan.com/products/Surfactants/NINEX%C2%AE/NINEX%C2%AEMT630F.aspx; accessed Oct. 15, 2017) (Year: 2012).*

(Continued)

*Primary Examiner* — Dominic Lazaro
(74) *Attorney, Agent, or Firm* — Fox Rothschild LLP

(57) ABSTRACT

The present invention is directed to agricultural formulations containing an agriculturally active ingredient in a suitable solvent system for generating foam containing formulations for application in a furrow in the form of a foam. The agriculturally active ingredient may be an insecticide, a pesticide, a fungicide, an herbicide, a fertilizer, or a combination thereof.

20 Claims, No Drawings

(56) References Cited

FOREIGN PATENT DOCUMENTS

| | | | |
|---|---|---|---|
| JP | 2010-083797 A | 4/2010 | |
| JP | 2012-525413 A | 10/2012 | |
| JP | 2013014573 A | 1/2013 | |
| JP | 2013-513663 A | 4/2013 | |
| WO | 1985/01876 A1 | 5/1985 | |
| WO | 1998/16106 A1 | 4/1998 | |
| WO | 2001/076352 A1 | 10/2001 | |
| WO | 2001/089503 A1 | 11/2001 | |
| WO | 2006/066361 A1 | 6/2006 | |
| WO | 2006/124508 A1 | 11/2006 | |
| WO | 2006128707 A1 | 12/2006 | |
| WO | 2007/085899 A2 | 8/2007 | |
| WO | WO 2007085899 A2 * | 8/2007 | ............ A01N 25/06 |
| WO | 2010/117740 A2 | 10/2010 | |
| WO | 2010/129345 A2 | 11/2010 | |
| WO | 2011025789 A2 | 3/2011 | |
| WO | 2011/080208 A1 | 7/2011 | |
| WO | 2012/035015 A2 | 3/2012 | |
| WO | 2013/041975 A2 | 3/2013 | |
| WO | 2013/087430 A1 | 6/2013 | |
| WO | 2013/135605 A1 | 9/2013 | |
| WO | 2015/048757 A2 | 4/2015 | |

OTHER PUBLICATIONS

International Search Report and Written Opinion issued in connection with International Application No. PCT/US2015/037327 dated Sep. 2, 2015 (14 pages).

Partial International Search Report dated Feb. 13, 2017 in International Patent Application No. PCT/US16/065564 (3 pages).

Invitation to Pay Additional Fees (including partial International Search Report) dated Dec. 17, 2014 in connection with International Patent Application No. PCT/US2014/058340 (6 pages).

Third Party Observation submitted Mar. 30, 2016 relating to International Patent Application No. PCT/US2014/068571 (5 pages).

FMC Bifenthrin MSDS, http://www.fluoridealert.org/wp-content/pesticides/msds/bifenthrin.technical.pdf, accessed May 29, 2017.

Notification of Transmittal of International Preliminary Report on Patentability dated Dec. 4, 2017 (7 pages).

Zaoxiang Wang, "Pesticide processing series, pesticide auxiliaries", Chemical Industry Publishing, 1994, pp. 674-680, English abstract.

Notification of Transmittal of International Preliminary Report on Patentability dated Dec. 4, 2017 issued in PCT/US16/65564 (7 pages).

* cited by examiner

FOAM FORMULATIONS AND EMULSIFIABLE CONCENTRATES

CROSS-REFERENCE TO RELATED APPLICATION

This application claims the benefit of priority of U.S. Provisional Patent Application No. 62/016,242, filed Jun. 24, 2014, the entire disclosure of which is incorporated herein by reference.

FIELD OF THE DISCLOSED SUBJECT MATTER

The present invention relates to the field of agrochemical compositions and formulations.

BACKGROUND OF THE INVENTION

Many growers do not apply starter fertilizer, insecticide, or other beneficial agricultural treatments at the time of planting because the amount of additional transportation, handling, and labor required for such application.

Applying active ingredients to a large field requires the transport of large volumes of water. The water is commonly carried on a tractor, which has a limited capacity. Additionally, in some regions water in large quantities is unavailable. Many agricultural actives are applied to crops or soil as sprays. The active ingredient is typically added to a tank and mixed with a diluent such as water before being sprayed on the field or crop. The active ingredient may be in one of many known formulation types, for example, an emulsion concentrate, an emulsifiable solution, a microencapsulate, or a suspension concentrate. After dilution, using currently-known formulations and techniques, a typical application rate is approximately 9 gallons/acre. Application to 500 acres at a typical rate thus requires 4500 gallons of liquid. A tractor carrying a full load of seeds or other plant-generative material cannot accommodate such a high volume of liquid, so fertilizer, insecticide, or other treatment at time of planting requires multiple trips to refill the tractor's tanks.

Rather than make these trips, most growers prefer to load seed once and plant uninterrupted. Although this saves valuable planting time, it would be beneficial if a grower could load both seed and fertilizer, insecticide, or other beneficial treatments once and plant interrupted while applying a planting-time treatment.

Thus the field of agriculture is in need of new techniques and for formulating and applying agricultural active ingredients such as insecticides, herbicides, fungicides, pesticides, fertilizers, and plant nutrients. In particular, advances are needed that can reduce the volume of agricultural formulation needed to treat a particular area of field. This includes advances increasing the efficacy of a given volume of an agricultural formulation, as well as advances that allow more precise delivery of an agricultural formulation to the area where it can be most effective. Such high-precision, ultra-low-volume application techniques allow greater areas to be covered while using lower amounts of active ingredient and lower volumes of water. This results in greater resource efficiency, as well as time savings for the grower efficiency. Such techniques also reduce the amount of active ingredient applied to areas where such application may be either wasteful or actively harmful.

SUMMARY OF THE DISCLOSED SUBJECT MATTER

At least one aspect of the present invention is directed to an emulsifiable foaming concentrate having (a) an organic phase comprising an agriculturally active ingredient, and an organic solvent, and optionally at least one surfactant, and (b) a second phase comprising at least a foaming agent and optionally a foam stabilizer and (c) a surfactant phase. In another, the second phase is an aqueous phase. In another embodiment, the concentrate is substantially free of water.

In at least one embodiment of the present invention, the solvent of the organic phase are liquid hydrocarbons and liquid amides. In a more preferred embodiment, the amide solvents are linear solvents including but not limited to N,N-dimethyloctanamide, N,N-dimethyldecanamide, N-methyl-N-(2-propylheptyl)-acetamide, N-methyl-N-(2-propylheptyl)-formamide, and dimethyl formamide.

In another aspect, the present disclosure describes a second liquid concentrate formulation. The formulation contains an agriculturally active ingredient dissolved in an organic phase, at least one foaming agent, and at least one foam stabilizer, wherein the formulation is substantially free of water.

In one aspect, the presently described liquid formulation may be applied in a furrow in the form of a foam. In one embodiment, the agriculturally active ingredient may be an insecticide, a pesticide, a fungicide, an herbicide, a fertilizer, or a combination thereof. In a preferred embodiment, the agriculturally active ingredient is bifenthrin. In another embodiment, the foaming agent may be sodium lauryl sulfate, sodium dodecylbenzene sulfonate, or a combination thereof. In another embodiment, the foam stabilizer is glycerine, propylene glycol or dipropylene glycol.

In a preferred embodiment, the foaming agent is sodium lauryl sulfate, the foam stabilizer is glycerine, and the formulation also contains sodium dodecylbenzene sulfonate.

In another aspect of this invention, the liquid concentrates may be converted into a foam formulation that is applied directly to furrows. In this aspect, the concentrate is first mixed with an aqueous phase, preferably water, to form a pre-foam emulsion. In a preferred embodiment, such pre-foam emulsion is an oil-in-water emulsion. In another embodiment, the resulting oil-in-water emulsion is mixed with a gas to form a ready to use foam formulation. The resulting foam formulation contains an active ingredient dissolved in an organic phase, an aqueous phase, a gas phase and a surfactant phase. In one embodiment, the gas may be air. In another embodiment, the foam formulation is capable of providing a crop-protective effect when administered to a seed in-furrow. In further aspects of this embodiment, the foam formulation may have an expansion factor ranging from about 10 to about 50, more preferably 15, 25, 40 or 50.

In another aspect, the active ingredient containing liquid formulation of the present invention is in the form of an emulsifiable concentrate, a water-in-oil emulsion, or an oil-in-water emulsion. In one embodiment, the pre-foam or ready to use foam formulations are oil-in-water emulsions. In a preferred embodiment, the presently described emulsifiable foaming concentrate is in the form of a water-in-oil emulsion containing agriculturally suitable active ingredient.

In another aspect of this invention, the formulation can be in the form of a microemulsion having particles sizes less than 100 nm, preferably less than 10 nm. In a further embodiment, the emulsifiable foaming concentrate is stable over at least 60 days, preferably for at least two years.

In another aspect of this embodiment, the active ingredient is bifenthrin and is insecticidally effective when administered at a rate of 1 gallon per acre or less.

In another embodiment, this disclosure describes of a water-in-oil emulsifiable foaming concentrate comprising bifenthrin, glycerine, and an alkyl sulfate. In yet another embodiment, the liquid agricultural formulation may contain bifenthrin at concentrations ranging from about 13 to about 25%, more specifically at concentrations such as 13%, 17%, or 23%. In still further aspects, the alkyl sulfate may be sodium decyl sulfate, and may be present at a concentration of at least 1.25% to about 15%.

DETAILED DESCRIPTION OF EXEMPLARY EMBODIMENTS DEFINITIONS

The following terms shall have the respective meanings set forth below.

"Agricultural agent" means a bioactive agent used in agriculture, such as an herbicide, a pesticide, an insecticide, a fungicide, or a fertilizer.

"Bioactive agent" means a substance such as a chemical that can act on a cell, virus, organ or organism, including but not limited to insecticides, fungicides and herbicides, which substance creates a change in the functioning of the cell, virus, organ or organism.

A particle size, $D_{90}$, shall mean that at least about 90% of the particles in the composition are smaller than the given $D_{90}$, as measured by Horiba LA920 particle size analyzer.

Drain time" such as "25% Drain Time," or $DT_{25}$, is a measure of foam's stability and is the time required for 25% of foam's volume to disintegrate.

"Organic Solvents" as used herein include cyclic, straight-chain or linear amide solvents; straight-chained or branched hydrocarbons with a chain length from $C_1$ to $C_{18}$. Other suitable solvents that can be named are glycol ether, butyl propylene carbomates.

"Concentrate" as used herein are meant to include such compositions that contain less than 12.5% w/v water, preferably less than 10% water, and most preferably less than 5% water and further when mixed with the aqueous medium, an emulsion, preferably a stable emulsion is formed. In such scenario, the emulsion typically being the end-user formulation that will be used by the end-user, with the advantage that the end-user does not have to handle and store large quantities of such formulation, but can prepare the amounts necessary for the moment by using the concentrate. The end-user formulation can also be a foamable formulation that is applied directly to the crop.

The term "stable" in this context means the formulation's storage stability and suitability from commercial stand point of high purity, active ingredients degradation of less than 10% weight/weight or lack of precipitation or phase separation and/or color changes in the composition of interest as compared to similar composition having greater than 90% active ingredient and/or possess commercially desirable degree of precipitation, separation or color. In the context of emulsion formulations, the term "stable" also includes the ability of the formulation to produce foam after being stored for at least 90 days at a temperature of 50° Celsius and stay free of crystal residues.

The term "substantially free" means that the formulations of interest, either as a concentrate or as an emulsion, contain less than about 10% of the recited ingredient. As such, the phrase "a formulation substantially free of water" means a formulation that contains less than 10% weight per volume of water.

The term "effective amount" means an amount necessary to produce an observable effect on unwanted plant growth, including one or more of the effects of necrosis, death, growth inhibition, reproduction inhibition, inhibition of proliferation, and removal, destruction, or otherwise diminishing the occurrence and activity of unwanted plants.

More particularly, the present disclosure meets the needs for ultra-low-volume, high-precision application of agricultural active ingredients by providing a formulation capable of being foamed and applied in-furrow during planting. The foamable formulations of the present disclosure can be applied at between 0.25-1.00 gallons/acre, much lower than the volumes at which conventional methods are effective. This reduces by a factor of between 9 and 36 of the volume of liquid that is required to be carried on the tractor.

In addition, the foam generated by the formulations of the present disclosure may be applied directly in-furrow to seeds as they are being planted. This direct, precise application of the active ingredient to where it is most needed further reduces the amount of active ingredient that must be applied, further reducing the weight carried on the tractor.

Volume Needed for Various Delivery Methods (4.6 mph w/30" Rows)

| | Acre | | | Rate | |
|---|---|---|---|---|---|
| Application | Gallons/ acre | mL/ acre | Distance mL/foot | mL/ second | mL/ minute |
| Broadcast | 25 | 94625 | 5.43 | 36.66 | 2199 |
| Fertilizer | 9 | 34065 | 1.96 | 13.20 | 792 |
| T-Band | 3 | 11355 | 0.65 | 4.40 | 264 |
| Diluted Liquid Foam | 0.25 | 946 | 0.05 | 0.37 | 22 |
| Expanded Foam (25X) | 6.25 | 23656 | 1.36 | 9.16 | 550 |
| Expanded Foam (50X) | 12.50 | 47303 | 2.43 | 16.38 | 983 |

In preferred embodiments, the foamable concentrate of the present disclosure include at least one active ingredient in an organic phase, at least one foaming agent, and at least one foam stabilizer. In at least another aspect of the present invention, an emulsifiable foaming concentrate contains at least one on organic phase respectively having an agriculturally active ingredient, an organic solvent, optionally at least one surfactant; and a second phase having a foaming agent and a surfactant phase. In one embodiment, the second phase is an aqueous phase containing water.

The active ingredient of the foamable formulation may be an agriculturally appropriate active ingredient that can be formulated in a concentrate or other appropriate formulation type. An agriculturally appropriate active ingredient include herbicides, insecticides, fungicides, and fertilizers or combinations thereof. The final concentration of the active ingredient in the foamable formulation can range from 0.75-2.00 lbs a.i./gallon.

In one embodiment, the foaming concentrated stay stable emulsion for at least 30 days, 60 days, 90 days, 120 days, 180 days, preferably 240 days at temperature ranging 20°-50° Celsius and ambient pressure.

In one aspect of the present invention, an emulsifiable foaming concentrate is described having (a) an organic phase comprising an agriculturally active ingredient, and an organic solvent, and optionally at least one surfactant, and (b) a second phase comprising at least a foaming agent and optionally a foam stabilizer and (c) a surfactant phase. In another, the second phase is an aqueous phase. In another embodiment, the concentrate is substantially free of water. In a more preferred embodiment, the organic solvent is a linear amide solvent including but not limited to N,N-dimethyloctanamide, N,N-dimethyldecanamide, N-methyl- N-(2-propylheptyl)-acetamide, N-methyl-N-(2-propylheptyl)-formamide, and dimethyl formamide. In another embodiment such organic solvent is used for forming the organic phase of the foaming concentrate.

At least one aspect of the present invention is directed to emulsifiable foaming concentrates having no water. According to this aspect of the invention, the concentrate is uniphase containing the active ingredient in at least an organic solvent and a foaming agent.

In a preferred embodiment, the agriculturally active ingredient used in the instant concentrate is selected from the group consisting of insecticides, pesticides, fungicides, herbicides, fertilizers and combinations thereof. Suitable crop protection active ingredients for the formulations of the present disclosure include the following:

Insecticides: A1) the class of carbamates consisting of aldicarb, alanycarb, benfuracarb, carbaryl, carbofuran, carbosulfan, methiocarb, methomyl, oxamyl, pirimicarb, propoxur and thiodicarb; A2) the class of organophosphates consisting of acephate, azinphos-ethyl, azinphos-methyl, chlorfenvinphos, chlorpyrifos, chlorpyrifos-methyl, demeton-S-methyl, diazinon, dichlorvos/DDVP, dicrotophos, dimethoate, disulfoton, ethion, fenitrothion, fenthion, isoxathion, malathion, methamidaphos, methidathion, mevinphos, monocrotophos, oxymethoate, oxydemeton-methyl, parathion, parathion-methyl, phenthoate, phorate, phosalone, phosmet, phosphamidon, pirimiphos-methyl, quinalphos, terbufos, tetrachlorvinphos, triazophos and trichlorfon; A3) the class of cyclodiene organochlorine compounds such as endosulfan; A4) the class of fiproles consisting of ethiprole, fipronil, pyrafluprole and pyriprole; A5) the class of neonicotinoids consisting of acetamiprid, chlothianidin, dinotefuran, imidacloprid, nitenpyram, thiacloprid and thiamethoxam; A6) the class of spinosyns such as spinosad and spinetoram; A7) chloride channel activators from the class of mectins consisting of abamectin, emamectin benzoate, ivermectin, lepimectin and milbemectin; A8) juvenile hormone mimics such as hydroprene, kinoprene, methoprene, fenoxycarb and pyriproxyfen; A9) selective homopteran feeding blockers such as pymetrozine, flonicamid and pyrifluquinazon; A10) mite growth inhibitors such as clofentezine, hexythiazox and etoxazole; A11) inhibitors of mitochondrial ATP synthase such as diafenthiuron, fenbutatin oxide and propargite; uncouplers of oxidative phosphorylation such as chlorfenapyr; A12) nicotinic acetylcholine receptor channel blockers such as bensultap, cartap hydrochloride, thiocyclam and thiosultap sodium; A13) inhibitors of the chitin biosynthesis type 0 from the benzoylurea class consisting of bistrifluron, diflubenzuron, flufenoxuron, hexaflumuron, lufenuron, novaluron and teflubenzuron; A14) inhibitors of the chitin biosynthesis type 1 such as buprofezin; A15) moulting disruptors such as cyromazine; A16) ecdyson receptor agonists such as methoxyfenozide, tebufenozide, halofenozide and chromafenozide; A17) octopamin receptor agonists such as amitraz; A18) mitochondrial complex electron transport inhibitors pyridaben, tebufenpyrad, tolfenpyrad, flufenerim, cyenopyrafen, cyflumetofen, hydramethylnon, acequinocyl or fluacrypyrim; A19) voltage-dependent sodium channel blockers such as indoxacarb and metaflumizone; A20) inhibitors of the lipid synthesis such as spirodiclofen, spiromesifen and spirotetramat; A21) ryanodine receptor-modulators from the class of diamides consisting of flubendiamide, the phthalamide compounds (R)-3-Chlor-N1-{2-methyl-4-[1,2,2,2-tetrafluor-1-(trifluormethyl)ethyl]phenyl}-N2-(1-methyl-2-methylsulfonylethyl)phthalamid and (S)-3-Chlor-N1-{2-methyl-4-[1,2,2,2-tetrafluor-1-(trifluormethyl)ethyl] phenyl}-N2-(1-methyl-2-methylsulfonylethyl)phthalamid, chlorantraniliprole, cyantraniliprole, tetraniliprole, and cyclaniliprole; A22) compounds of unknown or uncertain mode of action such as azadirachtin, amidoflumet, bifenazate, fluensulfone, piperonyl butoxide, pyridalyl, sulfoxaflor; or A23) sodium channel modulators from the class of pyrethroids consisting of acrinathrin, allethrin, bifenthrin, cyfluthrin, lambda-cyhalothrin, cypermethrin, alpha-cypermethrin, beta-cypermethrin, zeta-cypermethrin, deltamethrin, esfenvalerate, etofenprox, fenpropathrin, fenvalerate, flucythrinate, tau-fluvalinate, permethrin, silafluofen and tralomethrin.

Fungicides: B1) azoles selected from the group consisting of bitertanol, bromuconazole, cyproconazole, difenoconazole, diniconazole, enilconazole, epoxiconazole, fluquinconazole, fenbuconazole, flusilazole, flutriafol, hexaconazole, imibenconazole, ipconazole, metconazole, myclobutanil, penconazole, propiconazole, prothioconazole, simeconazole, triadimefon, triadimenol, tebuconazole, tetraconazole, triticonazole, prochloraz, pefurazoate, imazalil, triflumizole, cyazofamid, benomyl, carbendazim, thia-bendazole, fuberidazole, ethaboxam, etridiazole and hymexazole, azaconazole, diniconazole-M, oxpoconazol, paclobutrazol, uniconazol, 1-(4-chlorophenyl)-2-([1,2,4]triazol-1-yl)-cycloheptanol and imazalilsulfphate; B2) strobilurins selected from the group consisting of azoxystrobin, dimoxystrobin, enestroburin, fluoxastrobin, kresoximmethyl, methominostrobin, orysastrobin, picoxystrobin, pyraclostrobin, trifloxystrobin, enestroburin, methyl (2-chloro-5-[1-(3-methylbenzyloxyimino)ethyl]benzyl)carbamate, methyl (2-chloro-5-[1-(6-methylpyridin-2-ylmethoxyimino)ethyl]benzyl)carbamate and methyl 2-(ortho-(2,5-dimethylphenyloxymethylene)-phenyl)-3-methoxyacrylate, 2-(2-(6-(3-chloro-2-methyl-phenoxy)-5-fluoro-pyrimidin-4-yloxy)-phenyl)-2-methoxyimino-N-methyl-acetamide and 3-methoxy-2-(2-(N-(4-methoxyphenyl)-cyclopropanecarboximidoylsulfanylmethyl)-phenyl)-acrylic acid methyl ester; B3) carboxamides selected from the group consisting of carboxin, benalaxyl, benalaxyl-M, fenhexamid, flutolanil, furametpyr, mepronil, metalaxyl, mefenoxam, ofurace, oxadixyl, oxycarboxin, penthiopyrad, isopyrazam, thifluzamide, tiadinil, 3,4-dichloro-N-(2-cyanophenyl)isothiazole-5-carboxamide, dimethomorph, flumorph, flumetover, fluopicolide (picobenzamid), zoxamide, carpropamid, diclocymet, mandipropamid, N-(2-(4-[3-(4-chlorophenyl)prop-2-yn-yloxy]-3-methoxyphenyl)ethyl)-2-methanesulfonyl-amino-3-methylbutyramide, N-(2-(4-[3-(4-chlorophenyl)prop-2-yn-yloxy]-3-methoxy-phenyl)ethyl)-2-ethanesulfonylamino-3-methylbutyramide, methyl 3-(4-chlorophenyl)-3-(2-isopropoxycarbonylamino-3-methyl-butyrylamino)propionate, N-(4'-bromobiphenyl-2-yl)-4-difluoromethyl-methylthiazole-δ-carboxamide, N-(4'-trifluoromethyl-biphenyl-2-yl)-4-difluoromethyl-2-methylthiazole-5-carboxamide, N-(4'-chloro-3'-fluorobiphenyl-2-yl)-4-difluoromethyl-2-methyl-thiazole-5-carboxamide, N-(3,4'-dichloro-4-fluorobiphenyl-2-yl)-3-difluoro-methyl-1-methylpyrazole-4-carboxamide, N-(3',4'-dichloro-5-fluorobiphenyl-2-yl)-3-difluoromethyl-1-methylpyrazole-4-carboxamide, N-(2-cyano-phenyl)-3,4-dichloroisothiazole-5-carboxamide, 2-amino-4-methyl-thiazole-5-carboxanilide, 2-chloro-N-(1,1,3-trimethyl-indan-4-yl)-nicotinamide, N-(2-(1,3-dimethylbutyl)-phenyl)-1,3-dimethyl-5-fluoro-1H-pyrazole-4-carboxamide, N-(4'-chloro-3',5-difluoro-biphenyl-2-yl)-3-difluoromethyl-1-methyl-1H-pyrazole-4-carboxamide, N-(4'-chloro-3',5-difluoro-biphenyl-2-yl)-3-trifluoromethyl-1-methyl-1H- pyrazole-4-carboxamide, N-(3',4'-dichloro-5-fluoro-biphenyl-2-yl)-3-trifluoromethyl-1-methyl-1H-pyrazole-4-carboxamide, N-(3',5-difluoro-4'-methyl-biphenyl-2-yl)-3-difluoromethyl-1-methyl-1H-pyrazole-4-carboxamide, N-(3',5-difluoro-4'-methyl-biphenyl-2-yl)-3-trifluoromethyl-1-methyl-1H-pyrazole-4-carboxamide, N-(cis-2-bicyclopropyl-2-yl-phenyl)-3-difluoromethyl-1-methyl-1H-pyrazole-4-carboxamide, N-(trans-bicyclopropyl-2-yl-phenyl)-3-difluoro-methyl-1-methyl-1H-pyrazole-4-carboxamide, fluopyram, N-(3-ethyl-3,5-5-trimethyl-cyclohexyl)-3-formylamino-2-hydroxy-benzamide, oxytetracyclin, silthiofam, N-(6-methoxy-pyridin-3-yl)cyclopropanecarboxamide, 2-iodo-N-phenyl-benzamide, N-(2-bicyclo-propyl-2-yl-phenyl)-3-difluormethyl-1-methylpyrazol-4-ylcarboxamide, N-(3',4',5'-trifluorobiphenyl-2-yl)-1,3-dimethylpyrazol-4-ylcarboxamide, N-(3',4',5'-trifluorobiphenyl-2-yl)-1,3-dimethyl-5-fluoropyrazol-4-ylcarboxamide, N-(3',4',5'-trifluorobiphenyl-2-yl)-5-chloro-1,3-dimethylpyrazol-4-ylcarboxamide, N-(3',4',5'-trifluorobiphenyl-2-yl)-3-fluoromethyl-1-methylpyrazol-4-ylcarboxamide, N-(3',4',5'-trifluorobiphenyl-2-yl)-3-(chlorofluoromethyl)-1-methylpyrazol-4-ylcarboxamide, N-(3',4',5'-trifluorobiphenyl-2-yl)-3-difluoromethyl-1-methylpyrazol-4-ylcarboxamide, N-(3',4',5'-trifluorobiphenyl-2-yl)-3-difluoromethyl-5-fluoro-1-methylpyrazol-4-yl-carboxamide, N-(3',4',5'-trifluorobiphenyl-2-yl)-5-chloro-3-difluoromethyl-1-methylpyrazol-4-ylcarboxamide, N-(3',4',5'-trifluorobiphenyl-2-yl)-3-(chlorodifluoromethyl)-1-methylpyrazol-4-ylcarboxamide, N-(3',4',5'-trifluorobiphenyl-2-yl)-1-methyl-3-trifluoromethylpyrazol-4-ylcarboxamide, N-(3',4',5'-trifluorobiphenyl-2-yl)-5-fluoro-1-methyl-3-trifluoromethylpyrazol-4-ylcarboxamide, N-(3',4',5'-trifluorobiphenyl-2-yl)-5-chloro-1-methyl-3-trifluoromethylpyrazol-4-ylcarboxamide, N-(2',4',5'-trifluorobiphenyl-2-yl)-1,3-dimethylpyrazol-4-ylcarboxamide, N-(2',4',5'-trifluorobiphenyl-2-yl)-1,3-dimethyl-5-fluoropyrazol-4-ylcarboxamide, N-(2',4',5'-trifluorobiphenyl-2-yl)-5-chloro-1,3-dimethylpyrazol-4-ylcarboxamide, N-(2',4',5'-trifluorobiphenyl-2-yl)-3-fluoromethyl-1-methylpyrazol-4-ylcarboxamide, N-(2',4',5'-trifluorobiphenyl-2-yl)-3-(chlorofluoromethyl)-1-methylpyrazol-4-ylcarboxamide, N-(2',4',5'-trifluorobiphenyl-2-yl)-3-difluoromethyl-1-methylpyrazol-4-ylcarboxamide, N-(2',4',5'-trifluorobiphenyl-2-yl)-3-difluoromethyl-5-fluoro-1-methylpyrazol-4-ylcarboxamide, N-(2',4',5'-trifluorobiphenyl-2-yl)-5-chloro-3-difluoromethyl-1-methylpyrazol-4-ylcarboxamide, N-(2',4',5'-trifluorobiphenyl-2-yl)-3-(chlorodifluoromethyl)-1-methylpyrazol-4-ylcarboxamide, N-(2',4',5'-trifluorobiphenyl-2-yl)-1-methyl-3-trifluoromethylpyrazol-4-ylcarboxamide, N-(2',4',5'-trifluorobiphenyl-2-yl)-5-fluoro-1-methyl-3-trifluoromethylpyrazol-4-ylcarboxamide, N-(2',4',5'-trifluorobiphenyl-2-yl)-5-chloro-1-methyl-3-trifluoromethylpyrazol-4-ylcarboxamide, N-(3',4'-dichloro-3-fluorobiphenyl-2-yl)-1-methyl-3-trifluoromethyl-1H-pyrazole-4-carboxamide, N-(3',4'-dichloro-3-fluorobiphenyl-2-yl)-1-methyl-3-difluoromethyl-1H-pyrazole-4-carboxamide, N-(3',4'-difluoro-3-fluorobiphenyl-2-yl)-1-methyl-3-trifluoromethyl-1H-pyrazole-4-carboxamide, N-(3',4'-difluoro-3-fluorobiphenyl-2-yl)-1-methyl-S-difluoromethyl-1H-pyrazole-4-carboxamide, N-(3'-chloro-4'-fluoro-3-fluorobiphenyl-2-yl)-1-methyl-3-difluoromethyl-1H-pyrazole-4-carboxamide, N-(3',4'-dichloro-4-fluorobiphenyl-2-yl)-1-methyl-3-trifluoromethyl-1H-pyrazole-4-carboxamide, N-(3',4'-difluoro-4-fluorobiphenyl-2-yl)-1-methyl-S-trifluoromethyl-1H-pyrazole-4-carboxamide, N-(3',4'-dichloro-4-fluorobiphenyl-2-yl)-1-methyl-3-difluoromethyl-1H-pyrazole-4-carboxamide, N-(3',4'-difluoro-4-fluorobiphenyl-2-yl)-1-methyl-3-difluoromethyl-1H-pyrazole-4-carboxamide, N-(3'-chloro-4'-fluoro-4-fluorobiphenyl-2-yl)-1-methyl-S-difluoromethyl-1H-pyrazole-4-carboxamide, N-(3',4'-dichloro-5-fluorobiphenyl-2-yl)-1-methyl-3-trifluoromethyl-1H-pyrazole-4-carboxamide, N-(3',4'-difluoro-5-fluorobiphenyl-2-yl)-1-methyl-3-trifluoromethyl-1H-pyrazole-4-carboxamide, N-(3',4'-dichloro-5-fluorobiphenyl-2-yl)-1-methyl-S-difluoromethyl-1H-pyrazole-4-carboxamide, N-(3',4'-difluoro-5-fluorobiphenyl-2-yl)-1-methyl-3-difluoromethyl-1H-pyrazole-4-carboxamide, N-(3',4'-dichloro-5-fluorobiphenyl-2-yl)-1,3-dimethyl-1H-pyrazole-4-carboxamide, N-(3'-chloro-4'-fluoro-5-fluorobiphenyl-2-yl)-1-methyl-3-difluoromethyl-1H-pyrazole-4-carboxamide, N-(4'-fluoro-4-fluorobiphenyl-2-yl)-1-methyl-3-trifluoromethyl-1H-pyrazole-4-carboxamide, N-(4'-fluoro-5-fluorobiphenyl-2-yl)-1-methyl-3-trifluoromethyl-1H-pyrazole-4-carboxamide, N-(4'-chloro-5-fluorobiphenyl-2-yl)-1-methyl-3-trifluoromethyl-1H-pyrazole-4-carboxamide, N-(4'-methyl-5-fluorobiphenyl-2-yl)-1-methyl-3-trifluoromethyl-1H-pyrazole-4-carboxamide, N-(4'-fluoro-5-fluorobiphenyl-2-yl)-1,3-dimethyl-1H-pyrazole-4-carboxamide, N-(4'-chloro-5-fluorobiphenyl-2-yl)-1,3-dimethyl-1H-pyrazole-4-carboxamide, N-(4'-methyl-5-fluorobiphenyl-2-yl)-1,3-dimethyl-1H-pyrazole-4-carboxamide, N-(4'-fluoro-6-fluorobiphenyl-2-yl)-1-methyl-3-trifluoromethyl-1H-pyrazole-4-carboxamide, N-(4'-chloro-6-fluorobiphenyl-2-yl)-1-methyl-3-trifluoromethyl-1H-pyrazole-4-carboxamide, N-[2-(1,1,2,3,3,3-hexafluoropropoxy)-phenyl]-3-difluoromethyl-1-methyl-1H-pyrazole-4-carboxamide, N-[4'-(trifluoromethylthio)-biphenyl-2-yl]-3-difluoromethyl-1-methyl-1H-pyrazole-4-carboxamide and N-[4'-(trifluoromethylthio)-biphenyl-2-yl]-1-methyl-3-trifluoromethyl-1-methyl-1H-pyrazole-4-carboxamide; B4) heterocyclic compounds selected from the group consisting of fluazinam, pyrifenox, bupirimate, cyprodinil, fenarimol, ferimzone, mepanipyrim, nuarimol, pyrimethanil, triforine, fenpiclonil, fludioxonil, aldimorph, dodemorph, fenpropimorph, tridemorph, fenpropidin, iprodione, procymidone, vinclozolin, famoxadone, fenamidone, octhilinone, proben-azole, 5-chloro-7-(4-methyl-piperidin-1-yl)-6-(2,4,6-trifluorophenyl)-[1,2,4]triazolo[1,5-a]pyrimidine, anilazine, diclomezine, pyroquilon, proquinazid, tricyclazole, 2-butoxy-6-iodo-3-propyl-chromen-4-one, acibenzolar-S-methyl, captafol, captan, dazomet, folpet, fenoxanil, quinoxyfen, N,N-dimethyl-3-(3-bromo-6-fluoro-2-methylindole-1-sulfonyl)-[1,2,4]triazole-1-sulfonamide, 5-ethyl-6-octyl-[1,2,4]triazolo[1,5-a]pyrimidin-2,7-diamine, 2,3,5,6-tetrachloro-4-methanesulfonyl-pyridine, 3,4,5-trichloro-pyridine-2,6-di-carbonitrile, N-(1-(5-bromo-3-chloro-pyridin-2-yl)-ethyl)-2,4-dichloro-nicotinamide, N-((5-bromo-3-chloro pyridin-2-yl)-methyl)-2,4-dichloro-nicotinamide, diflumetorim, nitrapyrin, dodemorphacetate, fluoroimid, blasticidin-S, chinomethionat, debacarb, difenzoquat, difenzoquat-methylsulphate, oxolinic acid and piperalin; B5) carbamates selected from the group consisting of mancozeb, maneb, metam, methasulphocarb, metiram, ferbam, propineb, thiram, zineb, ziram, diethofencarb, iprovalicarb, benthiavalicarb, propamocarb, propamocarb hydrochlorid, 4-fluorophenyl N-(1-(1-(4-cyanophenyl)-ethanesulfonyl)but-2-yl)carbamate, methyl 3-(4-chloro-phenyl)-3-(2-isopropoxycarbonylamino-3-methyl-butyrylamino)propanoate; or B6) other fungicides selected from the group consisting of guanidine, dodine, dodine free base, iminoctadine, guazatine, antibiotics: kasugamycin, streptomycin, polyoxin, validamycin A, nitrophenyl derivatives: binapacryl, dinocap, dinobuton, sulfur-containing heterocyclyl compounds: dithianon, isoprothiolane, organometallic compounds: fentin salts, organophosphorus compounds: edifenphos, iprobenfos, fosetyl, fosetyl-aluminum, phosphorous acid and its salts, pyrazophos, tolclofos-methyl, organochlorine compounds: dichlofluanid, flusulfamide, hexachloro-benzene, phthalide, pencycuron, quintozene, thiophanate-methyl, tolylfluanid, others: cyflufenamid, cymoxanil, dimethirimol, ethirimol, furalaxyl, metrafenone and spiroxamine, guazatine-acetate, iminoctadine-triacetate, iminoctadine-tris(albesilate), kasugamycin hydrochloride hydrate, dichlorophen, pentachlorophenol and its salts, N-(4-chloro-2-nitro-phenyl)-N-ethyl-4-methyl-benzenesulfonamide, dicloran, nitrothal-isopropyl, tecnazen, biphenyl, bronopol, diphenylamine, mildiomycin, oxincopper, prohexadione calcium, N-(cyclopropylmethoxyimino-(6-difluoromethoxy-2,3-difluoro-phenyl)-methyl)-2-phenyl acetamide, N'-(4-(4-chloro-3-trifluoromethyl-phenoxy)-2,5-dimethyl-phenyl)-N-ethyl-N-methyl formamidine, N'-(4-(4-fluoro-3-trifluoromethyl-phenoxy)-2,5-dimethyl-phenyl)-N-ethyl-N-methyl formamidine, N'-(2-methyl-5-trifluormethyl-4-(3-trimethylsilanyl-propoxy)-phenyl)-N-ethyl-N-methylformamidine and N'-(5-difluormethyl-2-methyl-4-(3-trimethylsilanyl-propoxy)-phenyl)-N-ethyl-N-methyl formamidine.

Herbicides: C1) acetyl-CoA carboxylase inhibitors (ACC), for example cyclohexenone oxime ethers, such as alloxydim, clethodim, cloproxydim, cycloxydim, sethoxydim, tralkoxydim, butroxydim, clefoxydim or tepraloxydim; phenoxyphenoxypropionic esters, such as clodinafop-propargyl, cyhalofop-butyl, diclofop-methyl, fenoxaprop-ethyl, fenoxaprop-P-ethyl, fenthiapropethyl, fluazifop-butyl, fluazifop-P-butyl, haloxyfop-ethoxyethyl, haloxyfop-methyl, haloxyfop-P-methyl, isoxapyrifop, propaquizafop, quizalofop-ethyl, quizalofop-P-ethyl or quizalofop-tefuryl; or arylaminopropionic acids, such as flamprop-methyl or flamprop-isopropyl; C2 acetolactate synthase inhibitors (ALS), for example imidazolinones, such as imazapyr, imazaquin, imazamethabenz-methyl (imazame), imazamox, imazapic or imazethapyr; pyrimidyl ethers, such as pyrithiobac-acid, pyrithiobac-sodium, bispyribac-sodium. KIH-6127 or pyribenzoxym; sulfonamides, such as florasulam, flumetsulam or metosulam; or sulfonylureas, such as amidosulfuron, azimsulfuron, bensulfuron-methyl, chlorimuron-ethyl, chlorsulfuron, cinosulfuron, cyclosulfamuron, ethametsulfuron-methyl, ethoxysulfuron, flazasulfuron, halosulfuron-methyl, imazosulfuron, metsulfuron-methyl, nicosulfuron, primisulfuron-methyl, prosulfuron, pyrazosulfuron-ethyl, rimsulfuron, sulfometuron-methyl, thifensulfuron-methyl, triasulfuron, tribenuron-methyl, triflusulfuron-methyl, tritosulfuron, sulfosulfuron, foramsulfuron or iodosulfuron; C3) amides, for example allidochlor (CDAA), benzoylpropethyl, bromobutide, chlorthiamid. diphenamid, etobenzanid, fluthiamide, fosamin or monalide; C4) auxin herbicides, for example pyridinecarboxylic acids, such as clopyralid or picloram; or 2,4-D or benazolin; C5) auxin transport inhibitors, for example naptalame or diflufenzopyr; C6) carotenoid biosynthesis inhibitors, for example benzofenap, clomazone, diflufenican, fluorochloridone, fluridone, pyrazolynate, pyrazoxyfen, isoxaflutole, isoxachlortole, mesotrione, sulcotrione (chlormesulone), ketospiradox, flurtamone, norflurazon or amitrol; C7) enolpyruvylshikimate-3-phosphate synthase inhibitors (EPSPS), for example glyphosate or sulfosate; C8) glutamine synthetase inhibitors, for example bilanafos or glufosinate-ammonium; C9) lipid biosynthesis inhibitors, for example anilides, such as anilofos or mefenacet; chloroacetanilides, such as dimethenamid, S-dimethenamid, acetochlor, alachlor, butachlor, butenachlor, diethatyl-ethyl, dimethachlor, metazachlor, metolachlor, S-metolachlor, pretilachlor, propachlor, prynachlor, terbuchlor, thenylchlor or xylachlor; thioureas, such as butylate, cycloate, di-allate, dimepiperate, EPTC. esprocarb, molinate, pebulate, prosulfocarb, thiobencarb (benthiocarb), tri-allate or vemolate; or benfuresate or perfluidone; C10) mitosis inhibitors, for example carbamates, such as asulam, carbetamid, chlorpropham, orbencarb, propyzamid, propham or tiocarbazil; dinitroanilines, such as benefin, butralin, dinitramin, ethalfluralin, fluchloralin, oryzalin, pendimethalin, prodiamine or trifluralin; pyridines, such as dithiopyr or thiazopyr; or butamifos, chlorthal-dimethyl (DCPA) or maleic hydrazide; C11) protoporphyrinogen IX oxidase inhibitors, for example diphenyl ethers, such as acifluorfen, acifluorfen-sodium, aclonifen, bifenox, chlomitrofen (CNP), ethoxyfen, fluorodifen, fluoroglycofen-ethyl, fomesafen, furyloxyfen, lactofen, nitrofen, nitrofluorfen or oxyfluorfen; oxadiazoles, such as oxadiargyl or oxadiazon; cyclic imides, such as azafenidin, butafenacil, carfentrazone, carfentrazone-ethyl, cinidon-ethyl, flumiclorac-pentyl, flumioxazin, flumipropyn, flupropacil, fluthiacet-methyl, sulfentrazone or thidiazimin; or pyrazoles, such as ET-751, JV 485 or nipyraclofen; C12) photosynthesis inhibitors, for example propanil, pyridate or pyridafol; benzothiadiazinones, such as bentazone; dinitrophenols, for example bromofenoxim, dinoseb, dinoseb-acetate, dinoterb or DNOC; dipyridylenes, such as cyperquat-chloride, difenzoquat-methylsulfate, diquat or paraquat-dichloride; ureas, such as chlorbromuron, chlorotoluron, difenoxuron, dimefuron, diuron, ethidimuron, fenuron, fluometuron, isoproturon, isouron, linuron, methabenzthiazuron, methazole, metobenzuron, metoxuron, monolinuron, neburon, siduron or tebuthiuron; phenols, such as bromoxynil or ioxynil; chloridazon; triazines, such as ametryn, atrazine, cyanazine, desmein, dimethamethryn, hexazinone, prometon, prometryn, propazine, simazine, simetryn, terbumeton, terbutryn, terbutylazine or trietazine; triazinones, such as metamitron; uracils, such as bromacil, lenacil or terbacil; or biscarbamates, such as desmedipham or phenmedipham; C13) synergists, for example oxiranes, such as tridiphane; C14) CIS cell wall synthesis inhibitors, for example isoxaben or dichlobenil; C16) various other herbicides, for example dichloropropionic acids, such as dalapon; dihydrobenzofurans, such as ethofumesate; phenylacetic acids, such as chlorfenac (fenac); or aziprotryn, barban, bensulide, benzthiazuron, benzofluor, buminafos, buthidazole, buturon, cafenstrole, chlorbufam, chlorfenprop-methyl, chloroxuron, cinmethylin, cumyluron, cycluron, cyprazine, cyprazole, dibenzyluron, dipropetryn, dymron, eglinazin-ethyl, endothall, ethiozin, flucabazone, fluorbentranil, flupoxam, isocarbamid, isopropalin, karbutilate, mefluidide, monuron, napropamide, napropanilide, nitralin, oxaciclomefone, phenisopham, piperophos, procyazine, profluralin, pyributicarb, secbumeton, sulfallate (CDEC), terbucarb, triaziflam, triazofenamid or trimeturon; or their environmentally compatible salts.

Plant Growth Regulators: D1) Antiauxins, such as clofibric acid, 2,3,5-tri-iodobenzoic acid; D2) Auxins such as 4-CPA, 2,4-D, 2,4-DB, 2,4-DEP, dichlorprop, fenoprop, IAA, IBA, naphthaleneacetamide, α-naphthaleneacetic acids, 1-naphthol, naphthoxyacetic acids, potassium naphthenate, sodium naphthenate, 2,4,5-T; D3) cytokinins, such as 2iP, benzyladenine, 4-hydroxyphenethyl alcohol, kinetin, zeatin; D4) defoliants, such as calcium cyanamide, dimethipin, endothal, ethephon, merphos, metoxuron, pentachlorophenol, thidiazuron, tribufos; D5) ethylene inhibitors, such as aviglycine, 1-methylcyclopropene; D6) ethylene releasers, such as ACC, etacelasil,ethephon, glyoxime; D7) gametocides, such as fenridazon, maleic hydrazide; D8) gibberellins, such as gibberellins, gibberellic acid; D9) growth inhibitors, such as abscisic acid, ancymidol, butralin, carbaryl, chlorphonium, chlorpropham, dikegulac, flumetralin, fluoridamid, fosamine, glyphosine, isopyrimol, jasmonic acid, maleic hydrazide, mepiquat, piproctanyl, prohydrojasmon, propham, tiaojiean, 2,3,5-tri-iodobenzoic acid; D10) morphactins, such as chlorfluren, chlorflurenol, dichlorflurenol, flurenol; D11) growth retardants, such as chlormequat, daminozide, flurprimidol, mefluidide, paclobutrazol, tetcyclacis, uniconazole; D12) growth stimulators, such as brassinolide, brassinolide-ethyl, DCPTA, forchlorfenuron, hymexazol, prosuler, triacontanol; D13) unclassified plant growth regulators, such as bachmedesh, benzofluor, buminafos, carvone, choline chloride, ciobutide, clofencet, cyanamide, cyclanilide, cycloheximide, cyprosulfamide, epocholeone, ethychlozate, ethylene, fuphenthiourea, furalane, heptopargil, holosulf, inabenfide, karetazan, lead arsenate, methasulfocarb, prohexadione, pydanon, sintofen, triapenthenol, trinexapac.

In at least one embodiment, the active ingredient in the concentrate or the end-ready to apply product is bifenthrin. In a more preferred embodiment, the ready to apply foamable formulation is a water-in-oil emulsion, and bifenthrin resides in the oil phase of the formulation.

The formulations of the present disclosure can also include a preservative. Suitable preservatives include but are not limited to $C_{12}$ to $C_{15}$ alkyl benzoates, alkyl p-hydroxybenzoates, aloe vera extract, ascorbic acid, benzalkonium chloride, benzoic acid, benzoic acid esters of $C_9$ to $C_{15}$ alcohols, butylated hydroxytoluene, butylated hydroxyanisole, tert-butylhydroquinone, castor oil, cetyl alcohols, chlorocresol, citric acid, cocoa butter, coconut oil, diazolidinyl urea, diisopropyl adipate, dimethyl polysiloxane, DMDM hydantoin, ethanol, ethylenediaminetetraacetic acid, fatty acids, fatty alcohols, hexadecyl alcohol, hydroxybenzoate esters, iodopropynyl butylcarbamate, isononyl iso-nonanoate, jojoba oil, lanolin oil, mineral oil, oleic acid, olive oil, parabens, polyethers, polyoxypropylene butyl ether, polyoxypropylene cetyl ether, potassium sorbate, propyl gallate, silicone oils, sodium propionate, sodium benzoate, sodium bisulfite, sorbic acid, stearic fatty acid, sulfur dioxide, vitamin E, vitamin E acetate and derivatives, esters, salts and mixtures thereof. Preferred preservatives include sodium o-phenylphenate, 5-chloro-2-methyl-4-isothiazolin-3-one, 2-methyl-4-isothiazolin-3-one, and 1,2-benisothiazolin-3-one.

In at least another embodiment of the present invention, the solvent of the organic phase include liquid hydrocarbons, liquid amides or mixtures thereof. In a more preferred embodiment, the amide solvent is a linear solvent including but not limited to N,N-dimethyloctanamide, N,N-dimethyldecanamide, N-methyl-N-(2-propylheptyl)-acetamide, N-methyl-N-(2-propylheptyl)-formamide, and dimethyl formamide.

Suitable foaming agents may be nonionic surfactants, including alkanolamides or alkyloamides (such as diethanolamide, lauric acid monoisopropanolamide, and ethoxylated myristamide), xyethylene fatty acid esters, polyoxyethylene fatty alcohol ethers (such as alkylaryl polyglycol ethers); anionic surfactants including alkyl-, alkylaryl- and arylsulfonates (such as sodium lauryl sarcosinate and such as sodium alkylbenzenesulfonate), alkyl-, alkylaryl- and arylsulfates, protein hydrolysates, derivatives of polycarboxylic acid (such as ammonium lauryl ether carboxylate), olefin sulfonates (such as sodium alpha olefin sulfonate), sarcosinates (such as ammonium cyclohexyl palmitoyl taurinate), succinates (such as disodium N-octadecyl sulfosuccinamate), phosphorus derivatives (such as phosphoric acid esters and their equivalent salts); cationic surfactants including alkylbenzyltrimethylammonium chloride; and amphoteric surfactants. Particularly preferred foaming agents are sodium dodecylbenzene sulfonate (ex. Bio-Soft® D-40), sodium $C_{14-16}$ olefin sulfonate (ex. Bioterge® AS-40), lauramine oxide (ex. Ammonyx® DO, Ammonyx® LO), ammonium lauryl sulfate (ex. Steol® CA-330), sodium, tridedeth sulfate (Cedepal® TD-407), and Alkyl sulfates (ex. Polystep® B-25). The total concentration of foaming agents in the formulation will be dependent on the foaming agents used, and may comprise between about 0.1% and about 50% of the final formulation, preferably between about 0.3% and about 30%, more preferably between about 5% and 25%, and even more preferably between about 17% and about 23%.

Suitable foam stabilizers act to stabilize the foam generated from the liquid, foamable formulation. An example of a suitable foam stabilizer is glycerine. Glycerine is particularly preferred. The total concentration of foam stabilizers in the formulation will be dependent on the foaming agents used, and may comprise between 0.1% and 15% of the total formulation, more preferably 7-12%.

The foamable formulations of the present invention may also include dispersants, and/or preservatives. Suitable dispersants include nonionic and/or ionic substances, and mixtures thereof.

Suitable preservatives include but are not limited to $C_{12}$ to $C_{15}$ alkyl benzoates, alkyl p-hydroxybenzoates, aloe vera extract, ascorbic acid, benzalkonium chloride, benzoic acid, benzoic acid esters of $C_9$ to $C_{15}$ alcohols, butylated hydroxytoluene, butylated hydroxyanisole, tert-butylhydroquinone, castor oil, cetyl alcohols, chlorocresol, citric acid, cocoa butter, coconut oil, diazolidinyl urea, diisopropyl adipate, dimethyl polysiloxane, DMDM hydantoin, ethanol, ethylenediaminetetraacetic acid, fatty acids, fatty alcohols, hexadecyl alcohol, hydroxybenzoate esters, iodopropynyl butylcarbamate, isononyl iso-nonanoate, jojoba oil, lanolin oil, mineral oil, oleic acid, olive oil, parabens, polyethers, polyoxypropylene butyl ether, polyoxypropylene cetyl ether, potassium sorbate, propyl gallate, silicone oils, sodium propionate, sodium benzoate, sodium bisulfite, sorbic acid, stearic fatty acid, sulfur dioxide, vitamin E, vitamin E acetate and derivatives, esters, salts and mixtures thereof. Preferred preservatives include sodium o-phenylphenate, 5-chloro-2-methyl-4-isothiazolin-3-one, 2-methyl-4-isothiazolin-3-one, and 1,2-benisothiazolin-3-one.

In at least one embodiment, the preferred organic solvent for dissolving the active ingredient in the organic phase are in concentrations ranging between 30 and 99.89 weight %, preferably between 40 to 65 weight %. In most preferred embodiment, the ratio of the amide solvent to the active ingredient is between 2:1 to 4:1, preferably 3:1.

Pre-foam emulsion formulations according to the present invention typically have a volume ratio between emulsifiable concentrate and aqueous phase of about 1:3; 1:5; 1:7.5; 1:10; 1:25; preferably about 1:7.5, and more preferably 1:5 for administration to an acre of 1-2 Qt total delivery volume.

The foamable emulsion of the present invention may be provided as such that its components may be provided separately. Hence, a kit of parts comprising the individual ingredients may be provided to the end-user. In another embodiment, the foamable formulation is a ready to use product contained in an applicator device, wherein the emulsion formulation may be applied to a target surface which upon exiting the applicator it is converted into a foam.

In at least one aspect of the present invention, an emulsifiable foaming concentrate contains at least one organic phase respectively having an agriculturally active ingredient, an organic solvent, and optionally at least one surfactant; a second phase having at least one surfactant and a foaming agent and optionally a foam stabilizer; and a surfactant phase. In a preferred embodiment the foaming concentrate of the present invention is substantially free of water having less than 10% water content, or more preferably having less than 5% water content. In one embodiment, the foaming concentrated stay stable emulsion for at least 30 days, 60 days, 90 days, 120 days, 180 days, 240 days preferably at least 2 years at 50° C. and ambient pressure.

In a preferred embodiment, the agriculturally active ingredient used in the instant concentrate is selected from the group consisting of insecticides, pesticides, fungicides, herbicides, fertilizers and combinations thereof. In at least one embodiment, the concentrate of the present invention contains bifenthrin.

In at least another embodiment of the present invention, the solvent of the organic phase may include liquid hydrocarbons, liquid amides or mixtures thereof. In at least one embodiment, the solvent is a cyclic amides. Examples of cyclic amides which may be used are N-octyl-2-pyrrolidone, N-dodecyl-2-pyrrolidone and N-dodecyl-caprolactam.

In a more preferred embodiment, the amide solvent is a linear solvent including but not limited to N,N-dimethyloctanamide, N,N-dimethyldecanamide, N-methyl-N-(2-propylheptyl)-acetamide, N-methyl-N-(2-propylheptyl)-formamide, dimethyl formamide, or N,N-dimethylcapramide.

In another aspect of the present invention, the concentrate contains at least one foaming agent selected from the group consisting of a nonionic surfactant, an anionic surfactant, a cationic surfactant, or an amphoteric surfactants. In one embodiment, the foaming agent is selected from the group consisting of sodium decyl sulfate, sodium lauryl sulfate and sodium dodecylbenzene sulfonate.

In another aspect of the present invention, the concentrate further contains at least one foam stabilizer such as glycerin.

In another aspect of the present invention, an emulsifiable foaming concentrate is mixed with water or a suitable aqueous solvent. In this aspect of the invention, the agricultural foaming emulsion contains (i) an emulsifiable foaming concentrate having (a) an organic phase respectively having an agriculturally active ingredient, an organic solvent, and at least one surfactant, and (b) a second phase comprising at least one surfactant, a foaming agent and an aqueous vehicle, and (ii) a suitable amount of water to provide stable emulsion for at least 30 days at 50° C., wherein the formulation is capable of forming foam. In a more preferred embodiment, the stability duration can range from 120 days to preferably for at least 240 days at ambient temperatures.

In at least another embodiment, the emulsion formulation has a ratio of emulsifiable foaming concentrate to water in the ranges between 95:5 to 5:95, preferably 70:30. In another embodiment, the foaming emulsion contains a gas such as air delivered by a pressure control delivering apparatus. In at least another embodiment, the agricultural foaming formulation comprise (i) an emulsifiable foaming concentrate comprising (a) an organic phase comprising an agriculturally active ingredient, an organic solvent, and (b) a second phase comprising at least one foaming agent, and (ii) water, wherein the formulation stays stable for at least 90 days at ambient pressure.

In another aspect of the present invention, methods of making and using of a emulsifiable foaming concentrate are described. In one embodiment, methods of mixing ingredients wherein organic phase and aqueous phase are prepared separately and then admixed under controlled condition. In another embodiment the aqueous and organic phases are prepared separately and then homogenized to produce the formulation.

In another aspect of the present invention, crop protective methods are described using the agricultural foaming emulsion containing an emulsifiable foaming concentrate having (a) an organic phase respectively having an agriculturally active ingredient, an organic solvent, and at least one surfactant, and (b) a second phase comprising at least one surfactant and a foaming agent, and (ii) a suitable amount of water to provide stable emulsion for at least 30 days, 60 days, 90 days, 120 days, 180 days, preferably 240 days. In a preferred embodiment, the agricultural foam is capable of providing a crop-protective effect when administered to a seed in-furrow. In another embodiment, the agricultural formulation is insecticidally effective when administered at a rate of 1 gallon per acre or less. In one embodiment, the emulsion is in the form of a foam. In another embodiment, the emulsion is created into a foam upon application to a target surface and has an expansion factor of at least 10, 12.5, 15, 25, 40 or preferably 50.

In other embodiments, the final formulation available for the end-user can be in the form of a water-in oil concentrated emulsion, a microemulsion, an oil-in-water, an emulsifiable concentrate, wherein the agriculturally active ingredient is dissolved in the liquid agricultural formulation. In another embodiment, the formulation can be in the form of a microemulsion having particles sizes less than 100 nm, preferably less than 10 nm. In yet another embodiment the microemulsion has a $D_{90}$ of smaller than 50, 20 or 10 nm. In a yet another embodiment, such formulation is stable over at least 60 days, preferably for at least two years.

In a more preferred embodiment, the bifenthrin is present at a concentration of at least 10, 12, 13, 14, 15, and up to about 20%. In yet another embodiment, the surfactant is present at a concentration of at least 5%, and up to about 40%.

In at least one embodiment the emulsifiable foam concentrate is prepared by adding bifenthrin and mixing it with an organic solvent mixture of N,N-dimethyloctanamide and N,N-dimethyldecanamide (Hallcomid M-8-10 from Stepan Company), sufficient amounts of second solvent such as methyloleate (Amesolv® CME from Ametech), sufficient amount of a mixture of surfactants such as calcium dodecyl benzene sulfonate (Rhodacal®60/BE from Solvay), ethopropoxylated alcohol (Antarox® B/848 from Solvay), alkoxyether of cetyl alcohol (Procetyl™ AWS from Croda Inc.) and sodium decyl sulfate solution (Polystep® B25 from Stepan Company) at ambient temperature until a homogenous solution was obtained. Such mixture may optionally contain light aromatic solvent naphtha, glycerine or a combination thereof.

In at least another embodiment, appropriate amounts of such concentrate is poured into container or tank, diluted and mixed with sufficient amount of a carrier such as water to form an emulsion. In another embodiment, the resulting emulsion may be administered through an adapter, for example a "Y" adapter, suitable for admixing a gas, such as air, with the emulsion at a suitable pressure in a mixing chamber or tank. In a preferred embodiment, foam is generated upon the mixing of air and the emulsion at suitable air pressure. The volume of foam can respectively be measured. The expansion may further be calculated on a volume/weight basis.

In another aspect of the present invention, the emulsion formulation may be provided in its components separately. Thus, a kit of parts comprising (a) an agricultural active ingredient, (b) an amide solvent as defined herein; (b) an emulsifying agent; and (c) at least one aqueous solvent and optionally water available for being combined prior to use.

EXAMPLES

Example 1

Emulsion Formulation for Insecticidal Foam Compositions

Preparation of an Emulsion Formulation Containing Bifenthrin for Foam Generation A mixture of 3.92 grams of bifenthrin technical (95.8 purity), 9.31 grams of a mixture of N,N-dimethyloctanamide and N,N-dimethyldecanamide (Hallcomid M-8-10 from Stepan Company), 7.19 grams of methyloleate (Amesolv® CME from Amethech), 2.57 grams of calcium dodecyl benzene sulfonate (Rhodacal®60/BE from Solvay Group), 0.76 gram of an ethopropoxylated alcohol (Antarox® B/848 from Solvay Group), 2.57 grams of a mixes alkoxyether of cetyl alcohol (Procetyl™ AWS from Crodia Inc.) and 3.79 grams of a 40% sodium decyl sulfate solution (Polystep® B25 from Stepan Company) was stirred at ambient temperature until a homogenous solution was obtained. Additional formulations were also prepared using the method of Example 1 and are summarized in Table 1 below and are designated Examples 1A through 1E.

TABLE 1

Example 1 Emulsion Formulations

| Ingredient | Example 1A (grams) | Example 1B (grams) | Example 1C (grams) | Example 1D (grams) | Example 1E (grams) |
|---|---|---|---|---|---|
| Bifenthrin | 84.50 | 5.44 | 5.20 | 195.08 | 3.76 |
| Hallcomid | 201.50 | 8.80 | 14.0 | 465.03 | 9.05 |
| Amesolv | 156.01 | 0 | 0 | 361.74 | 0 |
| Rhodacal | 55.38 | 4.02 | 5.40 | 127.50 | 3.83 |
| Antarox | 16.25 | 1.06 | 1.0 | 37.55 | 1.21 |
| Procetyl | 55.25 | 4.23 | 6.44 | 127.5 | 5.01 |
| Polystep | 81.20 | 13.53 | 8.06 | 187.84 | 4.28 |
| Aromatic 100* | 0 | 0 | 0 | 0 | 3.30 |
| Glycerin | 0 | 0 | 0 | 0 | 1.07 |

* *Aromatic 100 is Aromatic 100 Fluid, a light aromatic solvent naphtha from ExxonMobile Chemicals Foam Generation:

The appropriate amount of test emulsion formulation was poured into a 50 mL graduated cylinder and diluted upto 50 mL with tap water. The cylinder was stoppered and inverted to mix the contents well. The diluted formulation was poured into a 60 mL plastic syringe and the syringe plunger was fixed into place. The syringe was affixed into a syringe pump and a piece of plastic tubing was attached to the syringe end. The other end of this tubing was attached to an inlet of a "Y" adapter. The other "Y" adapter inlet was attached to an air supply hose. A plastic tube was attached to the exit of the "Y" adapter, the other end of which was attached to a mixing chamber containing pieces of an O Cedar® Scrunge® Pad (to generate surface area for foam generation). The exit of the mixing chamber was attached to an exit tube leading to a collection beaker. The foam was generated by setting the syringe pump to 12.5 mL/min. and 12 psi of air pressure. The volume of foam collected and weight were measured and the expansion was calculated on a volume/weight basis. Table 2 below summarizes the amount of formulation tested and the expansion rate achieved.

TABLE 2

Foam Expansion Achieved

| Formulation Tested (Grams) | Amount Of Water For Dilution (mL) | Expansion Rate Achieved |
|---|---|---|
| Example 1(10.3) | 39.7 | 17.5X |
| Example 1A (10.3) | 39.7 | 17X |
| Example 1B (10.3) | 39.7 | 17.6X |
| Example 1C (10.3) | 39.7 | 16.9X |
| Example 1D (10.3) | 39.7 | 17X |
| Example 1E (10.3) | 39.7 | 16X |

Example 2

Preparation of an Emulsion Formulation Containing Bifenthrin for Foam Generation Step A) In a beaker, a mixture of 125.0 grams of bifenthrin technical (95.8 purity), 100.02 grams of a mixture of N,N-dimethyloctanamide and N,N-dimethyldecanamide (Hallcomid M-8-10 from Stepan Company), 200.0 grams of aromatic 100 and 40.06 grams of a nonionic polymeric surfactant (Atlox™ 4914, from Croda Crop Care) was heated to about 70° C. and stirred until homogenous.

Step B) In a separate beaker, a mixture of 300.12 79 grams of a 40% sodium decyl sulfate solution (Polystep® B25 from Stepan Company), 50.07 grams of an ethopropoxylated alcohol (Antarox® B/848 from Solvay Group), 90.10 grams of a mixes alkoxyether of cetyl alcohol (Procetyl™ AWS from Croda Inc.) and 95.36 grams of glycerin was heated to about 70° C. and stirred until homogenous.

Step C) The mixture from Step A was added to the container holding the mixture of Step B and the resultant mixture was homogenized using a Polytron lab homogenizer forming a solution. The solution was stirred slowly until reaching ambient temperature.

Additional formulations were also prepared using the method of Example 2 and are summarized in Table 3 below and are designated Examples 2A and 2B.

TABLE 3

Emulsion Formulations

| Ingredient | Example 2A (Grams) | Example 2B (Grams) |
|---|---|---|
| Step A | | |
| Bifenthrin | 160.01 | 190.0 |
| Hallcomid | 70.02 | 50.0 |
| Aromatic 100 | 200.17 | 199.95 |
| Atlox 4914 | 40.07 | 40.07 |
| Step B | | |
| Polystep B25 | 300.0 | 300.06 |
| Antarox B848 | 50.03 | 50.03 |
| Procetyl AWS | 90.09 | 85.0 |
| Glycerin | 90.05 | 86.20 |

Foam Formation and Expansion Measurement:

The formulations of Example 2 were tested on a field test unit to determine foaming characteristics. Each formulation was tank mixed with water, to an active ingredient concentration of 4.6%, and the resulting fluid was foamed and applied with a four-row configuration at a speed of 5.2 mph and a rate of 32 or 64 oz/acre. In order to calculate expansion, a volume of foam was collected from each of the four applicator ends, weighed and the expansion rate calculated on a volume/weight basis. The four values generated are averaged in Table 4 below.

TABLE 4

Formulation Expansion Rates

| Formulation | 32 oz/acre | 64 oz/acre |
|---|---|---|
| Example 2 | 10.7X | 16.8X |
| Example 2A | 18.8X | 14.7X |
| Example 2B | 12.1X | 13.1X |

Example 3

Comparative Emulsifiable Foam Concentrates

A mixture of 5.27 grams of bifenthrin technical (95.8 purity), 12.01 grams of an oxo-heptyl acetate ester (Exxate™ 700 from ExxonMobil Company), 5.41 grams of calcium dodecyl benzene sulfonate (Rhodacal®60/BE from Solvay Group), 1.0 gram of an ethopropoxylated alcohol (Antarox® B/848 from Solvay Group), 6.45 grams of a mixes alkoxyether of cetyl alcohol (Procetyl™ AWS from Croda Inc.) and 10.54 grams of a 40% sodium decyl sulfate solution (Polystep® B25 from Stepan Company) was stirred at ambient temperature until a homogenous solution was obtained.

Additional formulations were also prepared using the method of Example 3 and are summarized in Table 3 below and are designated Examples 3A through 3F.

TABLE 5

Emulsion formulations

| Ingredient* | Example 3A (grams) | Example 3B (grams) | Example 3C (grams) | Example 3D (grams) | Example 3E (grams) | Example 3F (grams) |
|---|---|---|---|---|---|---|
| Bifenthrin | 5.22 | 5.24 | 5.23 | 5.23 | 5.20 | 5.21 |
| Exxate 800 | 12.08 | 0 | 0 | 0 | 0 | 0 |
| Exxate 900 | 0 | 12.01 | 0 | 0 | 0 | 0 |
| Exxate 1200 | 0 | 0 | 12.00 | 0 | 0 | 0 |
| Stepan C25 | 0 | 0 | 0 | 12.00 | 0 | 0 |
| Stepan C42 | 0 | 0 | 0 | 0 | 12.00 | 0 |
| Aromatic 150 | 0 | 0 | 0 | 0 | 0 | 12.02 |
| Rhodacal | 5.48 | 5.40 | 5.41 | 5.41 | 5.45 | 5.44 |
| Antarox | 1.08 | 1.06 | 1.08 | 1.00 | 1.03 | 1.02 |
| Procetyl | 6.43 | 6.43 | 6.40 | 6.41 | 6.43 | 6.41 |
| Polystep | 10.01 | 10.02 | 10.00 | 10.08 | 10.04 | 10.08 |

*Exxate™ acetate esters from ExxonMobil Company
Stepan® C25 and Stepan® C42 are fatty acid methyl esters from Stepan Company
Aromatic 150 fluid from ExxanMobil Company Foam Generation:

The appropriate amount of test emulsion formulation from Example 3 was poured into a 50 mL graduated cylinder and diluted with to 50 mL with tap water. The cylinder was stoppered and inverted to mix the contents well. The diluted formulation was poured into a 60 mL plastic syringe and the syringe plunger was fixed into place. The syringe was affixed into a syringe pump and a piece of plastic tubing was attached to the syringe end. The other end of this tubing was attached to an inlet of a "Y" adapter. The other "Y" adapter inlet was attached to an air supply hose. A plastic tube was attached to the exit of the "Y" adapter, the other end of which was attached to a mixing chamber containing pieces of an O Cedar® Scrunge® Pad (to generate surface area for foam generation). The exit of the mixing chamber was attached to an exit tube leading to a collection beaker. The foam was generated by setting the syringe pump to 12.5 mL/min. and 12 psi of air pressure. The volume of foam collected and weight were measured and the expansion was calculated on a volume/weight basis. Each test formulation produced little or no foam.

Without further elaboration, it is believed that one skilled in the art can, using the preceding description, can utilize the present invention to its fullest extent. Furthermore, while the present invention has been described with respect to aforementioned specific embodiments and examples, it should be appreciated that other embodiments utilizing the concept of the present invention are possible, and within the skill of one in the art, without departing from the scope of the invention. The preceding preferred specific embodiments are, therefore, to be construed as merely illustrative, and not limitative of the remainder of the disclosure in any way whatsoever.

We claim:

1. An agricultural foam comprising a foaming formulation and a gas, wherein said foaming formulation comprises:
   (1) an emulsifiable foaming concentrate comprising:
      (a) an organic phase comprising an agriculturally active ingredient selected from the group consisting of insecticides, pesticides, fungicides, herbicides, fertilizers and combinations thereof; and about 30 wt % to about 65 wt %, based on the weight of the emulsifiable foaming concentrate, of a liquid amide selected from the group consisting of N,N-dimethyloctanamide, N,N-dimethyldecanamide, N-methyl-N(2-propylheptyl)-acetaminde, N-methyl-N(2-propylheptyl)-formamide, N,N-dimethylcapramide and combinations thereof;
      (b) a second phase comprising at least one non-ionic surfactant; and a foaming agent comprising between about 5 wt % and about 25 wt %, based on the weight of the emulsifiable foaming concentrate, of at least one anionic surfactant selected from the group consisting of an alkyl sulfate, alkylaryl sulfate, aryl sulfate, alkyl sulfonate, alkylaryl sulfonate, aryl sulfonate and combinations thereof; and (2) water;

wherein said gas is air, and wherein the ratio of liquid amide to the agriculturally active agent is between 2:1 to 4:1, and wherein the foam has an expansion factor of up to 50.

2. The foam of claim 1, wherein the foaming agent is selected from the group consisting of sodium decyl sulfate, sodium lauryl sulfate, sodium dodecylbenzene sulfonate and a combination thereof.

3. The foam of claim 2, wherein the foaming agent is sodium lauryl sulfate or sodium decyl sulfate.

4. The foam of claim 1, additionally comprising a dispersant and a preservative.

5. The agricultural foam of claim 1, wherein said foaming formulation stays stable for at least 90 days at ambient pressure.

6. The foam of claim 1, wherein the ratio of said emulsifiable concentrate to said water is in the range between 95:5-5:95.

7. The foam of claim 1, wherein the agricultural foam provides a crop-protective effect when an effective amount thereof is administered to a seed in-furrow.

8. The foam of claim 1, wherein the foam has an expansion factor of at least 15 to about 50.

9. The foam of claim 1, wherein the formulation is selected from the group consisting of a water-in-oil emulsion, an oil-in-water emulsion, and a microemulsion.

10. The agricultural foam of claim 1, further comprising at least one foam stabilizer selected from the group consisting of glycerin, propylene glycol and dipropylene glycol.

11. The agricultural foam of claim 10, wherein said foam stabilizer is glycerin.

12. An agricultural foam comprising a foaming formulation and a gas, wherein the foaming formulation comprises:

(1) a foaming emulsion concentrate comprising bifenthrin, about 30 wt % to about 65 wt %, based on the weight of the emulsifiable foaming concentrate, of a liquid amide selected from the group consisting of N,N-dimethyloctanamide, N,N-dimethyldecanamide, N-methyl-N-(2-propylheptyl)-acetamide, N-methyl-N-(2-propylheptyl)-formamide, N,N-dimethylcapramide, and combinations thereof between about 5 wt % and about 25 wt %, based on the weight of the emulsifiable foaming concentrate, of at least one anionic surfactant selected from the group consisting of an alkyl sulfate, alkylaryl sulfate, aryl sulfate and combinations thereof; and (2) water;

wherein said gas is air, wherein the ratio of the liquid amide to bifenthrin is between 2:1 and 4:1, and wherein the foam has an expansion factor of up to 50.

13. The agricultural foam of claim 12, wherein bifenthrin is present at a concentration of at least 10%.

14. The agricultural foam of claim 12, further comprising a nonionic surfactant.

15. The agricultural foam of claim 14 wherein the total concentration of anionic surfactant and nonionic surfactant is up to about 40 wt %.

16. The agricultural foam of claim 12, wherein the alkyl sulfate is sodium decyl sulfate or sodium lauryl sulfate.

17. The agricultural foam of claim 12, wherein bifenthrin is present in about 15 wt % to about 20 wt %.

18. The agricultural foam of claim 12, further comprising at least one foam stabilizer selected from the group consisting of glycerin, propylene glycol and dipropylene glycol.

19. The agricultural foam of claim 18, wherein said foam stabilizer is glycerin.

20. The agricultural foam of claim 12, further comprising one or more compounds selected from the group consisting of fungicides, herbicides, fertilizers and combinations of two or more thereof.

* * * * *